March 11, 1930.  W. O. SMITH  1,749,785
HAY LOADER
Filed April 15, 1927  3 Sheets-Sheet 1
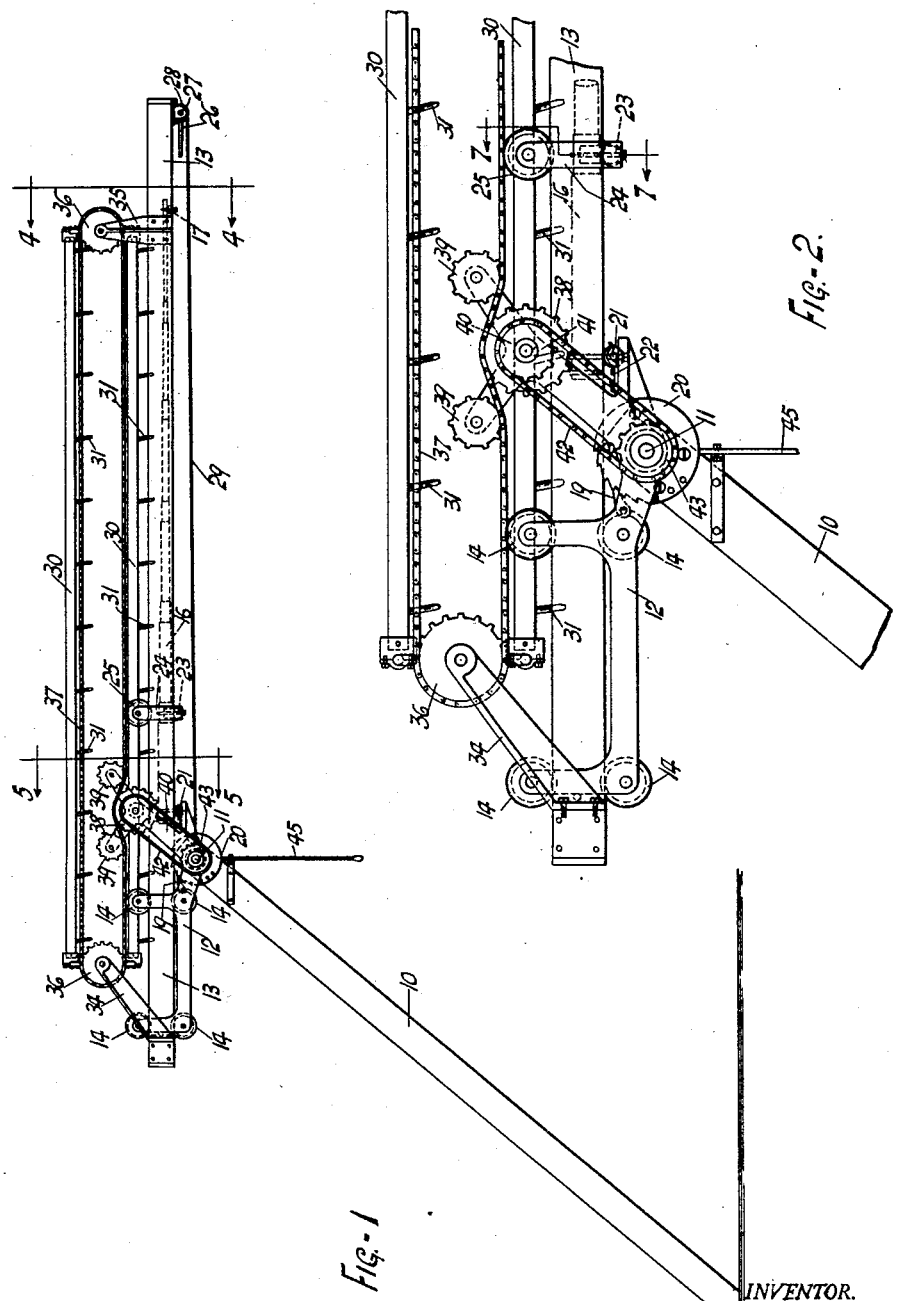
INVENTOR.
WILLIAM O. SMITH.
BY Ely T Barrow
ATTORNEYS.

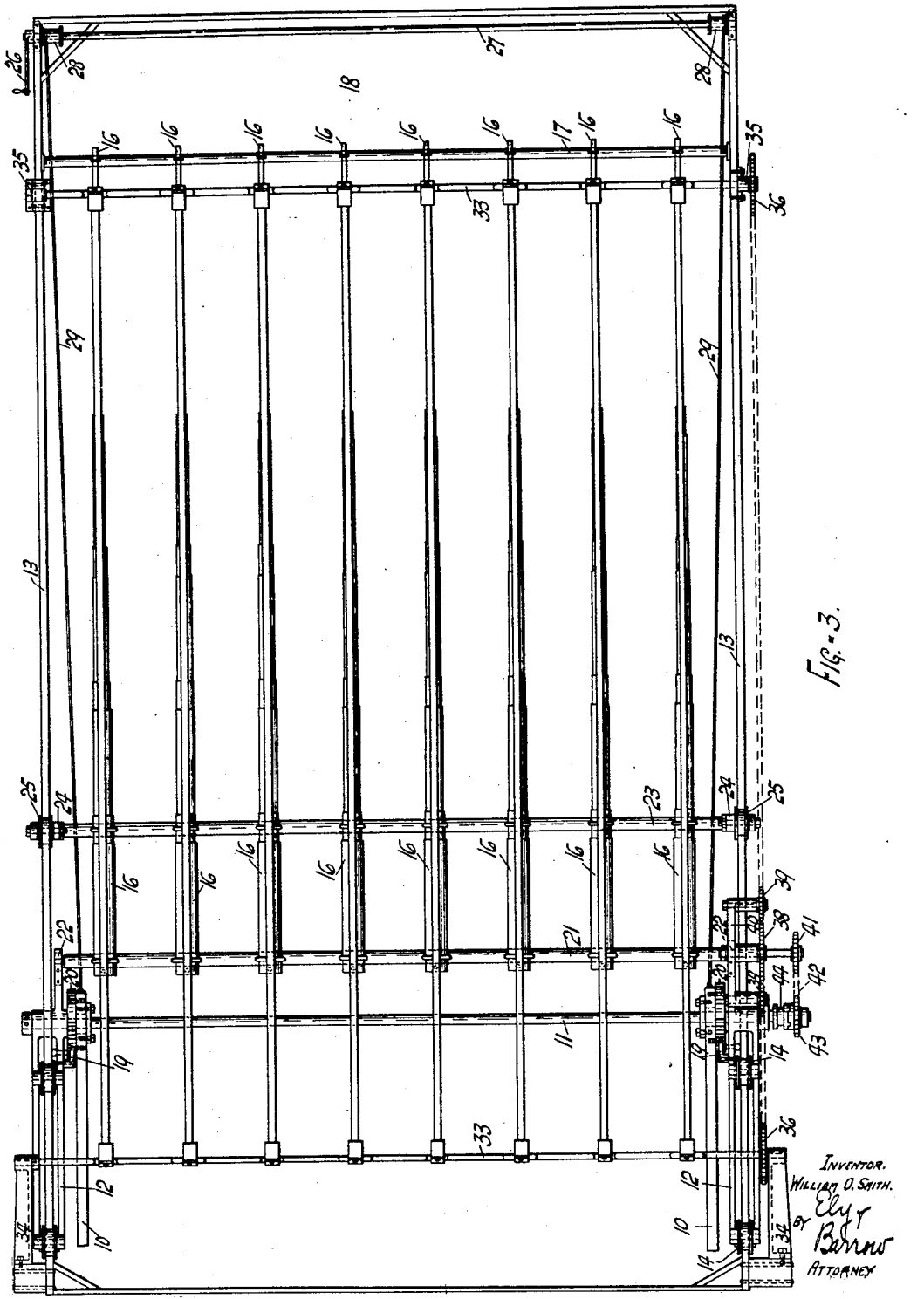

March 11, 1930.  W. O. SMITH  1,749,785
HAY LOADER
Filed April 15, 1927   3 Sheets-Sheet 3
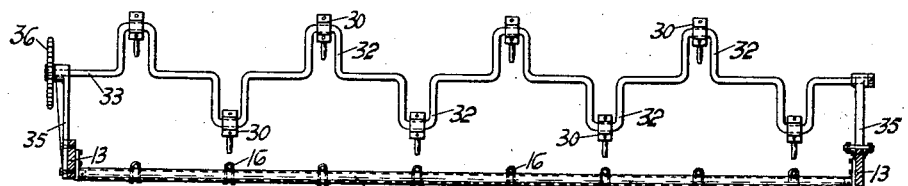
FIG.-4.
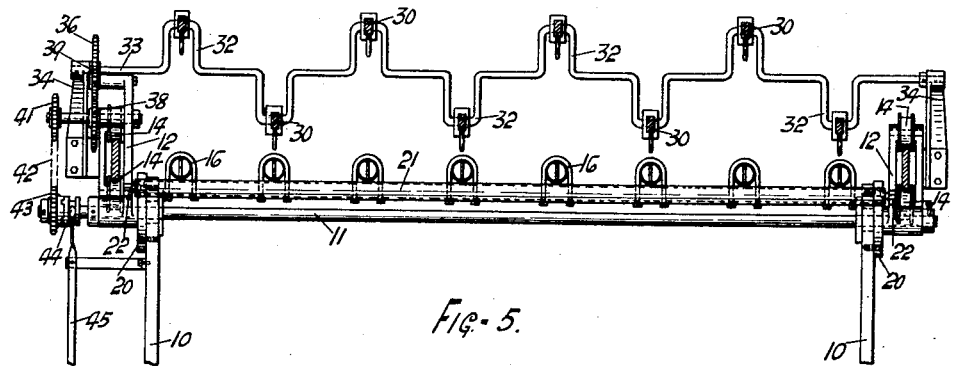
FIG.-5.
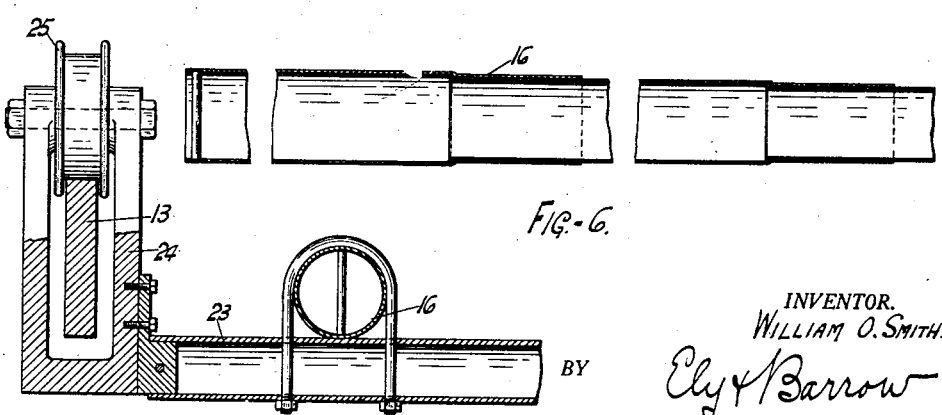
FIG.-6.
FIG.-7.
INVENTOR.
WILLIAM O. SMITH.
BY
ATTORNEYS.

Patented Mar. 11, 1930

1,749,785

UNITED STATES PATENT OFFICE

WILLIAM O. SMITH, OF CUYAHOGA FALLS, OHIO

HAY LOADER

Application filed April 15, 1927. Serial No. 183,968.

This invention relates to hay loaders.

The general purpose of the invention is to provide an improvement in hay loaders by which the hay may be uniformly distributed in a wagon or other receptacle, thus eliminating manual labor in the distribution of the hay fed into the wagon or receptacle by the loader.

The foregoing and other purposes are obtained by the loader illustrated in the accompanying drawings and described below. It is to be understood that the invention is not limited to the particular form thereof shown and described.

Of the accompanying drawings,

Figure 1 is a side elevation, partly diagrammatic, of a hay loader embodying the invention;

Figure 2 is an enlarged side elevation of a portion thereof;

Figure 3 is a plan thereof;

Figure 4 is a section on line 4—4 of Figure 1;

Figure 5 is a section on line 5—5 of Figure 1;

Figure 6 is a longitudinal section through an under conveyor member; and

Figure 7 is a detail part section on line 7—7 of Figure 2.

Referring to the drawings, the numerals 10, 10 indicate the frame members of a conventional hay loader (the conveyor being omitted) arranged to be driven by a shaft 11 in a conventional manner.

The improvement of the present invention consists in the provision of a distributor conveyor mounted on shaft 11. This conveyor is supported by brackets 12, 12 pivoted on shaft 11 and in which is slidably mounted a light frame 13, said frame sliding on brackets 12 between anti-friction rollers 14, 14. The bottom of the frame 13 is provided by a series of telescoping members 16 arranged to support the hay and which are connected at their forward ends to a cross member 17 spaced from the forward end of the frame so as to provide a space 18 through which the most of the hay is delivered by the distributing conveyor to the wagon or receptacle positioned under the frame 13.

The brackets 12 are pivoted as shown so that the forward end of the frame may be tilted downwardly to facilitate deposit of hay on the floor of the wagon or receptacle, the forward end of the frame being raised as the load of hay builds up. To hold the frame 13 in any determinate position, pawls 19 are provided on the brackets 12 to engage with ratchets 20 fixed to members 10.

The members 16 are supported at their rear ends on brackets 12 by a cross-piece 21 arranged to be releasably latched thereto by latches 22 and the forward end of the rear sections of members 16 are supported on a cross-piece 23 carried by brackets 24 suspended from frame 13 by rollers 25. This construction permits releasing of the rear sections of members 16 from brackets 12 and telescoping thereof forwardly to permit distribution of the hay into the rear end of the wagon.

The frame 13 is arranged to be moved rearwardly by operation of a crank 26 for rotating a shaft 27 supported in the forward end of said frame and carrying spools 28 on which wind cables 29 connected to members 10. Any suitable means may be provided for moving the frame forwardly, the particular frame shown being operable forwardly by hand by pulling on its forward end.

For feeding hay over the members 16, conveyor rakes 30, 30 are provided, these having teeth 31, 31 projecting downwardly therefrom and being mounted on cranks 32, 32 arranged on shafts 33, 33 journaled on brackets 34, 34 and 35, 35 extending upwardly from frame 13, alternate rakes being operable alternately downwardly and forwardly of the frame by said cranks to feed the hay forwardly as will be understood.

Shafts 33 have thereon sprockets 36, 36 which have trained thereover a chain 37 arranged to be driven in any position of frame 13 by means of a sprocket 38 on which the chain is held by idlers 39, 39, sprockets 38 and 39 being mounted on a bracket 40 which may be integral with one bracket 12. Sprocket 38 is driven by a sprocket 41 over which is trained a chain 42 driven by a sprocket 43 on shaft 11 and arranged to be driven by said shaft through a clutch 44 operable by a hand lever 45.

In use, the hay will be fed by the conventional loader 10 onto the members 16 and forwardly over these members to the ends thereof, dropping through space 18 into the wagon. The frame is first tipped downwardly, moved backwardly and pulled forwardly to distribute the hay and is gradually raised as the hay builds up, the hay being distributed at the rear end of the distributor conveyor by unlatching cross-piece 21 and telescoping member 16 forwardly. Movements of the frame while cross-piece 21 is latched causes members 16 to extend or contract as will be understood.

Due to the fact that the conveyor does not project beyond the point of delivery of the hay therefrom in any position of the distributing conveyor, it affords no obstruction to the necessary operation of compacting the hay on the load which is done by tramping it down as it is being distributed. The operator of the loader in moving back and forth over the load with the distributor conveyor effectively accomplishes this.

Modifications of the invention may be resorted to without departing from the spirit thereof or the scope of the appended claims.

What is claimed is:

1. The combination with a hay loader of a hay distributing conveyor arranged to receive hay from the loader said conveyor comprising a frame slidable on and tiltable downwardly from said loader, telescoping members supported by the loader and the forward end of the frame over which the hay is conveyed, conveyor rakes mounted on the frame for moving the hay over said telescopic members, means for operating said rakes from the hay loader, means for sliding the frame on said hay loader, and means for releasably connecting the rear ends of the telescopic members to the loader to permit forward telescoping thereof when desired to distribute hay from the rear end of said conveyor.

2. The combination with a hay loader of a hay distributing conveyor arranged to receive hay from the loader, said conveyor comprising a frame slidable on and tiltable downwardly from said loader, telescoping members supported by the loader and the forward end of the frame over which the hay is conveyed, conveyor rakes mounted on the frame for moving the hay over said telescopic members, means for operating said rakes from the hay loader, and means for sliding the frame on said hay loader.

3. The combination with a hay loader of a hay distributing conveyor arranged to receive hay from the loader, said conveyor comprising a frame slidable on said loader, telescoping members supported by the loader and the forward end of the frame over which the hay is conveyed, conveyor rakes mounted on the frame for moving the hay over said telescopic members, means for operating said rakes from the hay loader, and means for sliding the frame on said hay loader.

4. The combination with a hay loader of a hay distributing conveyor arranged to receive hay from the loader, said conveyor comprising a frame slidable on and tiltable downwardly from said loader, telescoping members supported by the loader and the forward end of the frame over which the hay is conveyed, a conveyor mounted on the frame for moving the hay over said telescopic members, and means for sliding the frame on said hay loader.

5. The combination with a hay loader of a hay distributing conveyor arranged to receive hay from the loader, said conveyor comprising a frame slidable on said loader, telescoping members supported by the loader and the forward end of the frame over which the hay is conveyed, a conveyor mounted on the frame for moving the hay over said telescopic members, and means for sliding the frame on said hay loader.

6. The combination with a hay loader of a hay distributing conveyor arranged to receive hay from the loader, said conveyor comprising a frame slidable on and tiltable downwardly from said loader, telescoping members supported by the loader and the forward end of the frame over which the hay is conveyed, and conveyor rakes mounted on the frame for moving the hay over said telescopic members.

7. The combination with a hay loader of a hay distributing conveyor arranged to receive hay from the loader, said conveyor comprising a frame slidable on said loader, telescoping members supported by the loader and the forward end of the frame over which the hay is conveyed, and conveyor rakes mounted on the frame for moving the hay over said telescopic members.

8. The combination with a hay loader of a hay distributing conveyor mounted thereon, said conveyor including an extensible, retractible frame over which the hay is adapted to be conveyed to the discharge end of the frame, the receiving end of which frame pivotally is mounted on the loader and the discharge end of which is adapted to be extended and retracted, and raised and lowered, and a traveling conveyor arranged over the frame to convey the hay thereover from the receiving end to the discharge end thereof, said conveyor being movably mounted on the loader and connected to the discharge end of the frame so as to move therewith and convey hay to said end in all positions thereof.

9. The combination with a hay loader of a hay distributing conveyor mounted thereon, said conveyor including an extensible, retractible frame over which the hay is adapted to be conveyed to the discharge end of the frame, the receiving end of which frame is mounted on the loader and the discharge end of which is adapted to be extended and retracted, and a traveling conveyor arranged over the frame to convey the hay thereover from the receiving end to the discharge end thereof, said conveyor being movably mounted on the loader and connected to the discharge end of the frame so as to move therewith and convey hay to said end in all positions thereof.

WILLIAM O. SMITH.